(12) United States Patent
Laurent et al.

(10) Patent No.: US 9,212,090 B2
(45) Date of Patent: Dec. 15, 2015

(54) PHOTOCATALYTIC MATERIAL

(75) Inventors: Stephane Laurent, Clichy (FR); Anne Durandeau, Paris (FR); Emmanuel Valentin, Le Plessis Trevise (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1004 days.

(21) Appl. No.: 13/383,530

(22) PCT Filed: Jul. 13, 2010

(86) PCT No.: PCT/EP2010/060085
§ 371 (c)(1),
(2), (4) Date: Feb. 29, 2012

(87) PCT Pub. No.: WO2011/006905
PCT Pub. Date: Jan. 20, 2011

(65) Prior Publication Data
US 2012/0149556 A1  Jun. 14, 2012

(30) Foreign Application Priority Data
Jul. 17, 2009 (FR) ..................... 09 54991

(51) Int. Cl.
| | | |
|---|---|---|
| *B01J 27/24* | (2006.01) | |
| *C03C 17/34* | (2006.01) | |
| *B01J 35/00* | (2006.01) | |
| *B01J 37/02* | (2006.01) | |
| *B01J 37/34* | (2006.01) | |
| *G02B 27/00* | (2006.01) | |
| *B01J 21/06* | (2006.01) | |

(52) U.S. Cl.
CPC ........... *C03C 17/3417* (2013.01); *B01J 35/004* (2013.01); *B01J 37/0244* (2013.01); *B01J 37/347* (2013.01); *C03C 17/3435* (2013.01); *C03C 17/3447* (2013.01); *G02B 27/0006* (2013.01); *B01J 21/063* (2013.01); *B01J 21/066* (2013.01); *C03C 2217/212* (2013.01); *C03C 2217/213* (2013.01); *C03C 2217/23* (2013.01); *C03C 2217/281* (2013.01); *C03C 2217/71* (2013.01); *C03C 2217/734* (2013.01); *Y10T 428/24942* (2015.01)

(58) Field of Classification Search
None
See application file for complete search history.

(56) References Cited

U.S. PATENT DOCUMENTS

| 5,450,238 A * | 9/1995 | Bjornard et al. ............... 359/580 |
|---|---|---|
| 2004/0043260 A1* | 3/2004 | Nadaud et al. ................ 428/701 |
| 2004/0248725 A1* | 12/2004 | Hiraoka et al. .................... 502/4 |
| 2006/0057298 A1* | 3/2006 | Krisko et al. ................. 427/402 |
| 2007/0218264 A1 | 9/2007 | Gueneau et al. |

FOREIGN PATENT DOCUMENTS

| EP | 1 291 331 | 3/2003 |
|---|---|---|
| JP | 11 109104 | 4/1999 |
| WO | 02 24971 | 3/2002 |
| WO | 2005 110937 | 11/2005 |

OTHER PUBLICATIONS

International Search Report Issued Sep. 1, 2010 in PCT/EP10/60085 Filed Jul. 13, 2010.

\* cited by examiner

*Primary Examiner* — Melvin C Mayes
*Assistant Examiner* — Stefanie Cohen
(74) *Attorney, Agent, or Firm* — Oblon, McClelland, Maier & Neustadt, L.L.P.

(57) ABSTRACT

One subject of the invention is a material comprising a substrate coated on at least one portion of at least one of its faces with a stack comprising a photocatalytic layer, the geometrical thickness of which is between 2 and 30 nm, and at least one pair of respectively high and low refractive index layers positioned underneath said photocatalytic layer so that in the or each pair, the or each high refractive index layer is closest to the substrate, said material being such that the optical thickness, for a wavelength of 350 nm, of the or each high refractive index layer, except the photocatalytic layer, is between 170 and 300 nm and the optical thickness, for a wavelength of 350 nm, of the or each low refractive index layer is between 30 and 90 nm.

17 Claims, No Drawings

PHOTOCATALYTIC MATERIAL

The invention relates to the field of materials comprising a substrate coated with a photocatalytic layer.

Photocatalytic layers, especially those based on titanium oxide, are known for conferring self-cleaning and anti-soiling properties on the substrates that they coat. Two properties are at the root of these advantageous features. Titanium oxide is first of all photocatalytic, that is to say that it is capable, under suitable radiation, generally ultraviolet radiation, of catalyzing the degradation reactions of organic compounds. This photocatalytic activity is initiated within the layer by the creation of an electron-hole pair. Furthermore, titanium oxide has an extremely pronounced hydrophilicity when it is irradiated by this same type of radiation. This high hydrophilicity allows mineral soiling to be removed under water runoff, for example rainwater runoff. Such materials, in particular glazing units, are described for example in application EP-A-0 850 204.

The objective of the invention is to increase the photocatalytic activity of materials coated with a photocatalytic layer.

For this purpose, one subject of the invention is a material comprising a substrate coated on at least one portion of at least one of its faces with a stack comprising a photocatalytic layer, the geometrical thickness of which is between 2 and 30 nm, and at least one pair of respectively high and low refractive index layers positioned underneath said photocatalytic layer so that in the or each pair, the or each high refractive index layer is closest to the substrate, said photocatalytic layer being in direct contact with the low refractive index layer of the pair furthest from the substrate. The material according to the invention is such that the optical thickness, for a wavelength of 350 nm, of the or each high refractive index layer, except the photocatalytic layer, is between 170 and 300 nm and the optical thickness, for a wavelength of 350 nm, of the or each low refractive index layer is between 30 and 90 nm.

The inventors have been able to demonstrate that the addition of very specific sublayers, the optical thickness of which is perfectly defined within narrow limits, made it possible to increase the absorption of ultraviolet radiation in the very heart of the photocatalytic layer. This significant increase in the absorption of radiation makes it possible to increase the number of electron-hole pairs initiated by the irradiation of the titanium oxide. This results in a surprising and very advantageous increase in the photocatalytic activity of the layer, which may, in certain cases, be increased by a factor of two or more.

The optical thickness of a material is defined, for a wavelength of 350 nm, as being the product of its geometrical thickness and its refractive index at the wavelength of 350 nm. Throughout the description of the present application, the optical thicknesses and refractive indices are always defined for a wavelength of 350 nm.

The expression "pair of respectively high and low refractive index layers" is understood to mean a set of two layers, constituted of a high refractive index layer and of a low refractive index layer. As explained below the high index layer and/or the low index layer may be a complex layer, constituted of several superposed individual layers.

The substrate may be made of any type of material, such as polymer, ceramic, glass, glass-ceramic or metal. Preferably, the substrate is a glass sheet. The sheet may be flat or curved, and may have any type of dimensions, especially greater than 1 meter. The glass is preferably of soda-lime-silica type, but other types of glasses, such as borosilicate glasses or aluminosilicates may also be used. The glass may be clear or extra-clear, or else colored, for example blue, green, amber, bronze or gray. The thickness of the glass sheet is typically between 0.5 and 19 mm, in particular between 2 and 12 mm, or even between 4 and 8 mm.

The photocatalytic layer is preferably based on titanium oxide, in particular is made of titanium oxide, especially at least partially crystallized in anatase form. Among the various forms of titanium oxide, amorphous, rutile, brookite or anatase, the latter specifically exhibits the highest photocatalytic activities. The titanium oxide may be pure or doped, for example doped with transition metals (for example W, Mo, V or Nb), lanthanide ions or noble metals (such as, for example, platinum or palladium), or else with nitrogen or carbon atoms. These various doping forms make it possible either to increase the photocatalytic activity of the material, or to shift the band gap of the titanium oxide to wavelengths close to the visible range or within this range. The photocatalytic layer may also be based on another photocatalytic material such as, for example, $SnO_2$ or $WO_3$.

The photocatalytic layer, in particular based on titanium oxide, is normally the last layer of the stack deposited on the substrate, in other words the layer of the stack furthest from the substrate. This is because it is important for the photocatalytic layer to be in contact with the atmosphere and its pollutants. It is however possible to deposit, on the photocatalytic layer, a very thin layer, generally that is discontinuous or porous. It may, for example, be a layer based on noble metals intended to increase the photocatalytic activity of the material. It may also be thin hydrophilic layers, for example made of silica, as taught in applications WO 2005/040058 or WO 2007/045805.

The geometrical thickness of the photocatalytic layer, especially based on titanium oxide, is preferably less than or equal to 25 nm, in particular 20 nm and even 15 nm and/or greater than or equal to 5 nm, in particular 7 nm, or even 10 nm. This is because the inventors have been able to demonstrate that the advantageous effects of the invention are even greater when the thickness of the titanium oxide layer is small. Indeed for large thicknesses, the reflection of the ultraviolet radiation by the titanium oxide is high, so that the effect of the presence of the very specific sublayers according to the invention is not very significant. The photocatalytic activity of very thin layers is, on the other hand, lower than that of thicker layers, so that there is a compromise in terms of thickness.

The material according to the invention preferably comprises one or two pairs of respectively high and low refractive index layers. It may contain more thereof, for example three, four, five or six thereof, or even ten or even more thereof, but the inventors have been able to observe that above two pairs, the addition of additional pairs did not give rise to a large increase in the photocatalytic activity. On the other hand, increasing the number of pairs is carried out to the detriment of the cost of the material and of the rapidity and ease of deposition of the layers. Moreover, a large number of pairs (above 2 pairs) generally results in an angular variation of the aesthetic appearance (in particular of the color) that is quite detrimental for an application as a glazing unit.

The stack covering the substrate is preferably constituted of the photocatalytic layer, especially based on titanium oxide, and of at least one pair of high and low refractive index layers. The multistack does not then comprise any other layer. In this case, the substrate is in direct contact with the high index layer of the pair closest to the substrate.

One layer of at least one pair may be formed from a single material alone, or from several different materials.

In the latter case, at least one high refractive index and/or low refractive index layer may itself be constituted of several superposed individual layers, for example of two, three or four individual layers. In the remainder of the text these layers, constituted of several superposed individual layers, are described as "complex" layers. The optical thickness of each complex layer then corresponds to the sum of the optical thicknesses of each of the individual layers constituting the complex layer. In order to obtain the advantageous effects, it is important for the overall optical thickness of the complex layer to be as defined according to the invention. The refractive index of the complex layer is then an average index, defined as being the ratio of the optical thickness of the complex layer to its geometrical thickness.

A complex layer may, for example, be constituted of two or three superposed individual layers. In the latter case, the three individual layers may be of different chemical nature. Alternatively, the two outermost individual layers may be identical and may surround an intermediate individual layer of different chemical nature.

In its simplest sense, which corresponds to the presence of a single pair, the material according to the invention successively comprises starting from the substrate, a high refractive index layer surmounted by a and in contact with a low refractive index layer, which is itself surmounted by a and in contact with a photocatalytic layer. One or more of these layers may be complex layers, as indicated previously.

In one more complex case, where two pairs are present, the material successively comprises, starting from the substrate, a first high refractive index layer surmounted by a and in contact with a first low refractive index layer, which is itself surmounted by a and in contact with a second high refractive index layer surmounted by a and in contact with a second low refractive index layer, the latter being surmounted by a and in contact with a photocatalytic layer. One or more of these layers may be complex layers, as indicated previously.

The choice of the optical thicknesses, for a wavelength of 350 nm, is of primary importance as it directly influences the gain in the absorption of ultraviolet radiation in the photocatalytic layer and therefore the gain in photocatalytic activity.

The optical thickness, for a wavelength of 350 nm, of the or each high index layer is preferably between 180 and 260 nm.

The optical thickness, for a wavelength of 350 nm, of the or each low index layer is preferably between 35 and 80 nm.

In one pair of high and low index layers, the optical thickness of the high refractive index layer is between 170 and 300 nm, in particular between 180 and 260 nm, and the optical thickness of the low refractive index layer is between 30 and 90 nm, in particular between 35 and 80 nm. It is preferable to use only a single pair of layers, in particular in a material constituted of the photocatalytic layer and of a pair of high and low refractive index layers. This embodiment provides materials of low light reflection for which the color in reflection is most agreeable, in blue or neutral tones, corresponding to negative a* and b* chromatic values (avoiding yellow or red colors). The high index layer may or may not be a complex layer, but the best results are obtained for a high index layer which is a complex layer. The low index layer is preferably not a complex layer. Good results have been able to be obtained when the complex high index layer is constituted of two individual layers, the closest one to the substrate having a lower refractive index than the individual layer located on top of it, the two individual layers each having a higher refractive index than the low index layer of the pair. Even better results are obtained when the complex high index layer is constituted of three individual layers. These three individual layers may be or may not be all different, and may all have a refractive index greater than the refractive index of the low index layer. Alternatively, the complex high index layer may comprise two high index layers, which are identical or different, surrounding a low index layer, which may be of the same nature as the low index layer of the pair.

The latter scenario may also be understood as a succession of two pairs of non-complex high and low index layers.

In a given pair, the high refractive index layer has a refractive index, for a wavelength of 350 nm, strictly greater than that of the low refractive index layer. If they are complex layers, within the meaning defined previously, the refractive index corresponds to the average refractive index of the complex layer. Thus, a complex high refractive index layer may comprise one or more individual layers having a low refractive index. Similarly, a complex low refractive index layer may comprise one or more individual layers having a high refractive index. The important thing is the overall index of the complex layer relative to the index of the other layer of the pair.

Preferably, the refractive index, for a wavelength of 350 nm, of the or each low refractive index layer is less than or equal to 1.7, in particular 1.65. If a low refractive index layer is a complex layer, it may nevertheless comprise at least one layer for which the index is higher, as long as the overall index of the complex layer is within the preferred range.

Equally preferably, the average refractive index, for a wavelength of 350 nm, of the or each high refractive index layer is greater than 1.7, in particular 1.8, or 1.9 and even 2.0 or 2.1, In certain cases, it may even be greater than or equal 2.2, in particular 2.3, or 2.4 and even 2.5. If a high refractive index layer is a complex layer, it may nevertheless comprise at least one layer for which the index is lower, as long as the overall index of the complex layer is within the preferred range.

It has been observed that the absorption of the ultraviolet radiation in the photocatalytic layer is higher when the difference in refractive indices between the high index layer and the low index layer of each pair increases. Preferably, the difference between the refractive indices, for a wavelength of 350 nm, of the low and high index layers is therefore greater than or equal to 0.2, even 0.3 or 0.4, in particular 0.5. This difference may even be greater than or equal to 0.8 or 0.9.

The or each high refractive index material is preferably an oxide or a nitride, in particular chosen from $Si_3N_4$, $TiO_2$, $ZrO_2$, $SnO_2$, $ZnO$, $Nb_2O_5$, $Ta_2O_5$ or any one of the mixtures or solid solutions thereof. It may also be mixtures such as, for example, $SnZnO_x$, $SnZnSbO_x$, $SiZrN_x$. These various materials may have the stoichiometry indicated above or a different stoichiometry. By way of example, the term "$Si_3N_4$" is understood more generally to mean any silicon nitride, without prejudging its actual stoichiometry. Similarly, the oxide or the nitride may be doped, in particular to give it properties of electrical conduction or of reflection of the infrared radiation and therefore a low emissivity. It may especially be the following materials: $SnO_2$ doped with fluorine, with antimony or with indium, $ZnO$ doped with aluminum or with gallium. Among these oxides or nitrides, silicon nitride is particularly preferred since it may be deposited by magnetron sputtering with high deposition rates. The same is true for $SnZnO_x$ and $SiZrN_x$. Titanium oxide also gives good results due to its very high refractive index.

The or each low refractive index material is preferably based on a material chosen from $SiO_2$, $Al_2O_3$, $SiOC$ or any one of the mixtures or solid solutions thereof. Fluorides such as $CaF_2$, $MgF_2$ and $LiF$ can also be used but are not preferred since they do not lend themselves to deposition via sputtering.

Here too, these various materials may have the stoichiometry indicated above or a different stoichiometry. These materials may be doped: there may for example be layers of silica doped, optionally with several percent of another chemical element, such as for example aluminum or zirconium. Among these materials, silicon oxide, in particular doped with aluminum, and silicon oxycarbide are particularly preferred for their low refractive indices and their ability to be deposited by sputtering. Silicon oxycarbide may also be deposited under good conditions by chemical vapor deposition (CVD).

Preferred pairs are, in particular, $Si_3N_4/SiO_2$ or $TiO_2/SiO_2$, $SnZnO_x/SiO_2$, $SiZrN_x/SiO_2$ since these layers have good chemical and climatic durability, which is particularly valuable when the stack is located on the outer side of the glazing unit (face generally denoted by the term "face 1"). When the high index layer is a complex layer constituted of two superposed individual layers, use is preferably made of an individual layer made of $Si_3N_4$ surmounted by a layer of $TiO_2$ or $SiZrN_x$.

A few embodiments are represented schematically below, solely by way of non-limiting examples. In these stacks, "S" represents the substrate, "H" a high refractive index layer, "B" a low refractive index layer and "$TiO_2$" the photocatalytic layer, which is generally based on titanium oxide. Typically, the layers "H" are made of $Si_3N_4$ or made of $TiO_2$, the layers "B" being made of $SiO_2$, but other materials may of course be used.

1: $S/H/B/TiO_2$
2: $S/H/B/H/B/TiO_2$
3: $S/H/B/H/B/H/B/TiO_2$
4: $S/H_1/H_2/B/TiO_2$
5: $S/H_1/H_2/H_3/B/TiO_2$
6: $S/H/B_1/B_2/TiO_2$

Embodiments 1, 2 and 3 correspond respectively to the presence of 1, 2 or 3 pairs of low and high index layers. The layers H may, for example, be made of $Si_3N_4$ or made of $TiO_2$ and the layers B made of $SiO_2$. The high and low index layers are not complex. In order to obtain colors in reflection that are as agreeable as possible, characterized by negative a* and b* chromatic values, the optical thickness of the or each layer H (in particular in the embodiment No. 1) is between 170 and 300 nm, in particular between 180 and 260 nm. The optical thickness of the layer B is between 30 and 90 nm, preferably between 35 and 80 nm.

In embodiment No. 4, a single pair is present, but the high index layer is a complex layer constituted of 2 superposed individual high index layers, denoted by $H_1$ and $H_2$. By way of example, the layers $H_1$ and $H_2$ may respectively be made of $Si_3N_4$ and $TiO_2$, or made of $Si_3N_4$ and $SiZrN_x$, the layer B being made of $SiO_2$. Whatever the variant of embodiment No. 4, and in order to obtain colors in reflection that are as agreeable as possible, characterized by negative a* and b* chromatic values, the optical thickness of the complex layer H (consequently the sum of the optical thicknesses of the individual layers $H_1$ and $H_2$) is between 170 and 300 nm, in particular between 180 and 260 nm. The optical thickness of the layer B is between 30 and 90 nm, or even between 35 and 80 nm. Preferably, the refractive index of the individual layer $H_1$ is lower than that of the individual layer $H_2$.

In embodiment No. 5, a single pair is present, but the high index layer is a complex layer constituted of 3 superposed individual layers denoted by $H_1$, $H_2$ and $H_3$. One of the layers, for example $H_2$, may have an index considered to be low relative to the other layers $H_i$, or even relative to the layer B, as long as the overall index of the complex layer H is higher than that of the layer B. By way of example, the layers $H_1$ and $H_3$ may be made of $TiO_2$ and the layer $H_2$ made of $Si_3N_4$, the layer B being made of $SiO_2$. In this case, the layer $H_2$ may be considered to be a low index layer relative to the layers $H_1$ and $H_3$. The layer $H_2$ may also have an index equal to or lower than that of the layer B, for example being made of $SiO_2$. A scheme identical to that from case No. 2 is then found, that is to say a succession of two pairs of non-complex layers. The layer $H_2$ may indeed be included both as an intermediate layer of a complex high index layer and as the low index layer of the first pair deposited on the substrate. Whatever the variant of embodiment No. 5, and in order to obtain colors in reflection that are as agreeable as possible, characterized by negative a* and b* chromatic values, the optical thickness of the complex layer H (consequently the sum of the optical thicknesses of the individual layers $H_1$, $H_2$ and $H_3$) is between 170 and 300 nm, in particular between 180 and 260 nm. The optical thickness of the layer B is between 30 and 90 nm, or even between 35 and 80 nm.

In embodiment No. 6, the low index layer of the sole pair is constituted of two superposed individual layers denoted by $B_1$ and $B_2$.

It goes without saying that the various advantageous features described above, for example the thicknesses, the refractive indices or the chemical nature of the materials, may be combined together, in all types of possible combinations. These various combinations have not been described in order not to needlessly increase the text.

The photocatalytic layer, especially based on titanium oxide, may be obtained by various processes. Preferably, it is a sputtering process, in particular enhanced by a magnetic field (magnetron sputtering process), in which the excited species of a plasma extract atoms from a target located opposite the substrate to be coated. The target may especially be made of metallic titanium or made of $TiO_x$, the plasma having to contain oxygen (the process being referred to as reactive sputtering). The deposition is preferably followed by a heat treatment intended to crystallize the titanium oxide in anatase form. It may, for example, be an annealing, toughening or bending treatment, or a treatment as described in application WO 2008/096089. Although it is less preferred, the coating based on titanium oxide may also be obtained by a sol-gel type process, in which a sol containing organometallic precursors of titanium is deposited on the substrate, before drying treatment and densification. The sol may also comprise particles of titanium oxide and a precursor of another material, for example silica. The coating based on titanium oxide may also be obtained by a pyrolysis process based on titanium precursors that decompose under the effect of the heat of the substrate. These precursors may be solid, liquid and preferably gaseous; this process is then referred to as chemical vapor deposition (CVD). The precursors may be, by way of example, titanium tetrachloride, titanium tetraisopropoxide or titanium tetraorthobutoxide.

The other layers of the stack are preferably deposited by sputtering, especially enhanced by a magnetic field (magnetron sputtering process). They may alternatively be deposited by sol-gel type processes or pyrolysis processes (especially of the CVD type). Sputtering however lends itself better to the deposition of multiple layers.

In the case of a deposition by the magnetron sputtering process, it is, for example, possible to deposit layers of $Si_3N_4$ or of $SiO_2$ using a silicon target, doped with aluminum, in a plasma containing argon and respectively nitrogen or oxygen.

Another subject of the invention is a glazing unit comprising at least one material according to the invention. The substrate is in this case made of glass. The glazing unit may be single glazing or multiple glazing (especially double or triple glazing), in the sense that it may comprise several glass sheets providing a gas-filled space. The glazing unit may also be laminated and/or toughened and/or hardened and/or curved.

The other face of the substrate coated according to the invention, or where appropriate a face of another substrate of the multiple glazing unit, may be coated with another functional layer or with a stack of functional layers. It may especially be another photocatalytic layer, for example another stack according to the invention. It may also be layers or stacks having a thermal function, in particular solar-protection or low-emissivity layers or stacks, for example stacks comprising a layer of silver protected by dielectric layers. It may also be a mirror layer, especially based on silver. It may also be a transparent conductive oxide layer, the material possibly being used as the front face of a photovoltaic cell.

The invention will be better understood in the light of the following non-limiting examples.

For the various examples (examples according to the invention and comparative examples), various properties are measured or calculated. These are:

the absorption of the UV radiation by the photocatalytic layer; this property is calculated for normal incidence and a wavelength of 350 nm;

the photocatalytic activity of the stack, measured according to the method described below;

the light reflection factor $R_L$, at normal incidence, calculated according to the NF EN 410:1999 standard;

the chromaticity coordinates a* and b*, calculated from the reflection spectrum at normal incidence (layer side), taking into consideration the illuminant D65 and the CIE-1931 standard observer.

The measurement of the photocatalytic activity is carried out in the following manner, by monitoring the degradation of stearic acid:

cutting samples of 5×5 cm$^2$;

cleaning the samples for 45 minutes under UV irradiation and under oxygen purging;

measuring the infrared spectrum by FTIR for wave numbers between 4000 and 400 cm$^{-1}$, in order to form a reference spectrum;

depositing stearic acid: 60 microliters of a solution of stearic acid dissolved in an amount of 5 g/l in methanol is deposited by spin-coating on the sample;

measuring the infrared spectrum by FTIR, measuring the area of the stretching bands of $CH_2$—$CH_3$ bonds between 3000 and 2700 cm$^{-1}$;

exposure to radiation of UVA type: the power received by the sample, of around 35 W/m$^2$ in order to simulate exposure outside, is controlled by a photoelectric cell within the wavelength range of 315-400 nm;

monitoring the photodegradation of the layer of stearic acid after successive exposure times of 10 minutes by measuring the area of the stretching bands of the $CH_2$—$CH_3$ bonds between 3000 and 2700 cm$^{-1}$; and the photocatalytic activity is defined by the slope, expressed in cm$^{-1}$·min$^{-1}$, of the straight line representing the area of the stretching bands of the $CH_2$—$CH_3$ bonds between 3000 and 2700 cm$^{-1}$ as a function of the exposure time to the UV radiation, for a period between 0 and 30 minutes.

COMPARATIVE EXAMPLE 1

Comparative example 1 is a sheet of clear soda-lime-silica glass having a thickness of 2 mm sold under the trade mark SGG Planilux by Saint-Gobain Glass France, successively deposited on which are 2 thin layers of $SiO_2$ (geometrical thickness of 50 nm) then of $TiO_2$ (geometrical thickness of 11.5 nm). The deposition is carried out by a magnetron sputtering process.

In order to crystallize the titanium oxide layer, the coated substrate undergoes a heat treatment at 630° C. for 8 minutes. All the examples, comparative or otherwise, undergo an identical heat treatment.

The absorption of the UV radiation having a wavelength of 350 nm, at normal incidence, is calculated in arbitrary values. Its value, which will be used as a reference for the other examples, is set at 100 (arbitrary unit).

To facilitate the comparison with the other examples, the photocatalytic activity is also set at a value of 100 (arbitrary unit).

EXAMPLE 1

Thin layers of $Si_3N_4$, $SiO_2$ and $TiO_2$ are successively deposited on a 2 mm thick sheet of clear soda-lime-silica glass sold under the trade mark SGG Planilux by Saint-Gobain Glass France. The deposition is carried out in a known manner by magnetron sputtering process.

The stack obtained is the following: glass/$Si_3N_4$ (30 nm)/$SiO_2$ (45 nm)/$Si_3N_4$ (35 nm)/$SiO_2$ (50 nm)/$TiO_2$ (11.5 nm).

The thicknesses are geometrical thicknesses. The optical thicknesses are respectively 64, 68, 75 and 76 nm.

This stack therefore comprises a single pair, the high index layer being a complex layer comprising three layers, of $Si_3N_4$, $SiO_2$ then $Si_3N_4$. The thickness of the complex layer is then 207 nm.

The absorption of the UV radiation is equal to 225, namely an absorption that is more than doubled relative to the comparative example 1. The photocatalytic activity measured is around 150 to 175 depending on the samples, namely an increase which may range up to 75% for a photocatalytic layer of the same thickness.

The $R_L$ factor is 11.3% and the a* and b* values are respectively −9 and −4. The negative chromatic values correspond to pleasant tints, ranging towards blue and green.

EXAMPLE 2

The stack from example 2 has the following structure: glass/$Si_3N_4$ (112 nm)/$SiO_2$ (50 nm)/$TiO_2$ (11.5 nm).

The thicknesses are geometrical thicknesses. The optical thicknesses are 239 nm for the high index layer made of $Si_3N_4$ and 76 nm for the low index layer made of $SiO_2$.

The absorption of the UV radiation is equal to 160. The $R_L$ is 9.9% and the a* and b* values are respectively −12 and −10.

EXAMPLE 3

Example 3 differs from example 2 by the choice of a $TiO_2$ layer having a geometrical thickness of 90 nm as a high index layer. Its optical thickness is 252 nm.

The absorption of the UV radiation is equal to 200. The $R_L$ factor is 9.5% and the a* and b* values are respectively −11 and −11. As in the case of example 2, the choice of a high index layer in the range of the invention makes it possible to obtain low reflections, and bluish tint.

The choice of titanium oxide, by virtue of its higher refractive index, itself makes it possible to increase the gain in UV absorption within the photocatalytic layer.

EXAMPLE 4

Example 4 differs from example 2 by the choice of an $SnZnO_x$ layer having a geometrical thickness of 110 nm as a high index layer. Its optical thickness is 235 nm.

The absorption of the UV radiation is equal to 150. The $R_L$ factor is 9.7% and the a* and b* values are respectively −12 and −12.

EXAMPLE 5

Example 5 differs from example 2 by the choice of an $SiZrN_x$ layer having a geometrical thickness of 105 nm as a high index layer. Its optical thickness is 230 nm.

The absorption of the UV radiation is equal to 185. The $R_L$ factor is 9.9% and the a* and b* values are respectively −12 and −12.

EXAMPLE 6

Example 6 differs from example 2 in that the high index layer made of $Si_3N_4$ is replaced by a complex layer constituted of 2 superposed individual layers, made of $Si_3N_4$ and $TiO_2$.

The stack from example 6 is the following: glass/$Si_3N_4$ (75 nm)/$TiO_2$ (35 nm)/$SiO_2$ (50 nm)/$TiO_2$ (11.5 nm).

The thicknesses are geometrical thicknesses. The optical thicknesses are respectively 160, 98 and 76 nm. The optical thickness of the high index complex layer is therefore 258 nm.

The absorption of the UV radiation is equal to 200. The $R_L$ factor is very low, in this case 5.8%, and the a* and b* values are respectively −7.8 and 0.6. The appearance in reflection is therefore very satisfactory.

EXAMPLE 7

Example 7 differs from example 6 in the following manner:
the individual layer of $TiO_2$ of the complex layer is replaced by an individual layer of $SiZrN_x$ having a geometrical thickness of 15 nm (optical thickness of 33 nm);
the individual layer of $Si_3N_4$ has a geometrical thickness of 100 nm (optical thickness of 214 nm).

The optical thickness of the high index complex layer is therefore 247 nm.

The absorption of the UV radiation is equal to 185. The $R_L$ factor is 10.0% and the a* and b* values are respectively −13.3 and −6.5.

EXAMPLE 8

Example 8 differs from example 7 in the following manner:
the individual layer of $SiZrN_x$ has a geometrical thickness of 20 nm (optical thickness of 44 nm);
the individual layer of $Si_3N_4$ has a geometrical thickness of 95 nm (optical thickness of 203 nm).

The optical thickness of the high index complex layer is therefore 247 nm.

The absorption of the UV radiation is equal to 185. The $R_L$ factor is 9.7% and the a* and b* values are respectively −13.4 and −5.7.

EXAMPLE 9

Example 9 differs from example 6 in the following manner:
the individual layer of $TiO_2$ has a geometrical thickness of 12 nm (optical thickness of 34 nm);
the individual layer of $Si_3N_4$ has a geometrical thickness of 101 nm (optical thickness of 216 nm).

The optical thickness of the high index complex layer is therefore 250 nm.

The absorption of the UV radiation is equal to 200. The $R_L$ factor is 9.0% and the a* and b* values are respectively −13.3 and −5.2.

EXAMPLE 10

Example 10 differs from example 6 in the following manner:
the individual layer of $TiO_2$ has a geometrical thickness of 20 nm (optical thickness of 56 nm);
the individual layer of $Si_3N_4$ has a geometrical thickness of 91 nm (optical thickness of 195 nm).

The optical thickness of the high index complex layer is therefore 251 nm.

The absorption of the UV radiation is equal to 215. The $R_L$ factor is 7.8% and the a* and b* values are respectively −12.8 and −1.

EXAMPLE 11

Example 12 differs from example 6 in the following manner:
the individual layer of $TiO_2$ has a geometrical thickness of 25 nm (optical thickness of 70 nm);
the individual layer of $Si_3N_4$ has a geometrical thickness of 95 nm (optical thickness of 203 nm);
the low index layer made of $SiO_2$ has a thickness of 40 nm (optical thickness of 61 nm).

The optical thickness of the high index complex layer is therefore 273 nm.

The absorption of the UV radiation is equal to 225. The $R_L$ factor is 9.7% and the a* and b* values are respectively −12.6 and −0.1.

COMPARATIVE EXAMPLE 2

In comparative example 2, the stack of layers subjacent to the photocatalytic layer is a stack intended, owing to constructive interference phenomena, to maximize the reflection of the ultraviolet radiation, known as a "UV mirror". The stack is the following: glass/$Si_3N_4$ (35 nm)/$SiO_2$ (65 nm)/$Si_3N_4$ (35 nm)/$SiO_2$ (65 nm)/$Si_3N_4$ (15 nm)/$TiO_2$ (11.5 nm).

The optical thicknesses of each of the layers are respectively 75, 99, 75, 99 and 32 nm. This stack may be considered as comprising a high index complex layer constituted of three layers and a low index complex layer, the latter being composed of the $SiO_2$ and $Si_3N_4$ layers. Its optical thickness is 131 nm, consequently outside of the ranges recommended by the invention.

The absorption of the UV radiation is equal to 50. The photocatalytic activity measured is around 70, namely 30% less than for comparative sample 1, and half of the activity of example 1 according to the invention.

These results are all the more surprising since it would be thought that by reflecting the ultraviolet radiation toward the titanium oxide layer, the photocatalytic activity would be intensified.

COMPARATIVE EXAMPLES 3 TO 6

These comparative examples illustrate stacks of the glass/$Si_3N_4$/$SiO_2$/$TiO_2$ type, in which the optical thicknesses of the high and low index layers are not in accordance with the invention.

For comparative example 3, the optical thickness of the $Si_3N_4$ layer is 85 nm and the optical thickness of the $SiO_2$ layer is 144 nm. The high refractive index and low refractive index layers do not therefore have a recommended thickness. In this case, the absorption of the UV radiation is only 50, which means that the photocatalytic activity should be lower than that of comparative example 1.

In the case of comparative example 4, the optical thickness of the $Si_3N_4$ layer is 149 nm and the optical thickness of the $SiO_2$ layer is 80 nm. Here it is the high refractive index layer which does not have the optical thickness recommended by the invention. The absorption of the UV radiation is 100, therefore only comparable to that of comparative example 1.

For comparative example 5, the optical thickness of the $Si_3N_4$ layer is 149 nm and the optical thickness of the $SiO_2$ layer is 144 nm. In this case where both (high and low index) layers do not have the claimed optical thicknesses, the absorption of the UV radiation is only 80, therefore lower than in the case of comparative example 1.

In the case of comparative example 6, the optical thickness of the $Si_3N_4$ layer is 53 nm and the optical thickness of the $SiO_2$ layer is 76 nm. The optical thickness of the high index layer is therefore outside of the zones recommended by the invention. The UV absorption is then equal to 160, which constitutes an improvement with respect to comparative example 1. On the other hand, the a* and b* values are respectively 1.5 and 11, which gives a yellow appearance in reflection.

The choice of the optical thicknesses of each of the layers, within a narrow range, is therefore essential in order to significantly improve the photocatalytic activity of the titanium oxide layer.

The invention claimed is:

1. A material comprising a substrate coated on at least one portion of at least one of its faces with a stack comprising a photocatalytic layer and at least one pair of refractive index layers positioned underneath the photocatalytic layer, wherein:
   the photocatalytic layer has a geometrical thickness of between 2 and 30 nm;
   each pair of refractive index layers comprises a high refractive index layer and a low refractive index layer, wherein an average refractive index of every low refractive index layer is less than or equal to 1.7, and an average refractive index of every high refractive index layer is greater than 1.7;
   in each pair of refractive index layers the high refractive index layer is closest to the substrate;
   the photocatalytic layer is in direct contact with a low refractive index layer of a pair of refractive index layers furthest from the substrate;
   the photocatalytic layer is in contact with the atmosphere and its pollutants;
   an optical thickness, for a wavelength of 350 nm, of every high refractive index layer is between 170 and 300 nm; and
   an optical thickness, for a wavelength of 350 nm, of every low refractive index layer is between 30 and 90 nm.

2. The material of claim 1, wherein the substrate is a glass sheet.

3. The material of claim 1, wherein the photocatalytic layer comprises titanium oxide that is at least partially crystallized in anatase form.

4. The material of claim 1, wherein the geometrical thickness of the photocatalytic layer is between 2 and less than or equal to 25 nm.

5. The material of claim 1, wherein the stack comprises one or two pairs of the refractive index layers.

6. The material of claim 1, wherein:
   the stack comprises, successively, the substrate, the high refractive index layer, the low refractive index layer, and the photocatalytic layer;
   the high refractive index layer is surmounted by and is in contact with the low refractive index layer; and
   the low refractive index layer is surmounted by and is in contact with the photocatalytic layer.

7. The material of claim 6, wherein the optical thickness, for a wavelength of 350 nm, of every high refractive index layer is between 180 and 260 nm.

8. The material of claim 7, wherein the optical thickness, for a wavelength of 350 nm, of every low refractive index layer is between 35 and 80 nm.

9. The material of claim 8, wherein every high refractive index layer is a complex layer comprising two or three superposed individual layers.

10. The material of claim 1, wherein the optical thickness, for a wavelength of 350 nm, of every high refractive index layer is between 180 and 260 nm.

11. The material of claim 1, wherein the optical thickness, for a wavelength of 350 nm, of every low refractive index layer is between 35 and 80 nm.

12. The material of claim 11, wherein every high refractive index layer is a complex layer comprising two or three superposed individual layers.

13. The material of claim 1, wherein every high refractive index layer comprises at least one of an oxide or a nitride.

14. The material of claim 13, wherein every high refractive index layer comprises at least one selected from the group consisting of $Si_3N_4$, $TiO_2$, $ZrO_2$, $SnO2$, $ZnO$, $Nb_2O_5$, and mixtures or solid solutions thereof.

15. The material of claim 1, wherein every low refractive index layer comprises at least one selected from the group consisting of $SiO_2$, $Al_2O_3$, $SiOC$, and mixtures or solid solutions thereof.

16. The material of claim 1, wherein the geometrical thickness of the photocatalytic layer is between 2 and less than or equal to 20 nm.

17. A glazing unit, comprising a material of claim 1.

* * * * *